United States Patent [19]

Luka

[11] Patent Number: 4,905,940
[45] Date of Patent: Mar. 6, 1990

[54] FLEXIBLE SUPPORT BUSHING

[76] Inventor: Alvin W. Luka, 7081 W. Morraine Dr., Littleton, Colo. 80123

[21] Appl. No.: 704,371

[22] Filed: Feb. 21, 1985

[51] Int. Cl.$^4$ ............................................. F16L 5/00
[52] U.S. Cl. ................................. 248/56; 174/153 G; 16/2
[58] Field of Search ............... 248/56; 16/2, 108, 109; 174/152 G, 153 G, 65 G; 285/162, 196, 338; 403/50, 51, 134

[56] References Cited

U.S. PATENT DOCUMENTS

| | | | |
|---|---|---|---|
| 2,311,427 | 2/1943 | Winkelmeyer | 16/2 |
| 2,717,792 | 9/1955 | Pelley | 174/152 G |
| 2,897,533 | 8/1959 | Bull | 248/56 |
| 3,495,028 | 2/1970 | Tutthill | 174/153 |
| 3,518,359 | 6/1970 | Trimble | 248/56 |
| 3,548,079 | 12/1970 | Jones | 174/153 |
| 3,609,214 | 9/1971 | Totsuka | 174/65 R |
| 3,924,308 | 12/1975 | Duprez | 24/274 R |
| 4,056,252 | 11/1977 | Simon | 248/56 |
| 4,232,421 | 11/1980 | Tucker | 16/2 |
| 4,309,007 | 1/1982 | Logsdon | 248/56 |
| 4,337,603 | 7/1982 | Davidson | 52/220 |
| 4,373,112 | 2/1983 | Mizuno | 174/65 R |

FOREIGN PATENT DOCUMENTS

| | | | |
|---|---|---|---|
| 661488 | 7/1965 | Belgium | 267/141 |
| 2410256 | 9/1975 | Fed. Rep. of Germany | 248/56 |
| 2709408 | 9/1978 | Fed. Rep. of Germany | 248/56 |
| 1019862 | 1/1953 | France | 174/153 G |
| 980297 | 12/1963 | United Kingdom | 16/2 |

Primary Examiner—Alvin C. Chin-Shue
Assistant Examiner—Robert A. Olson
Attorney, Agent, or Firm—Richard K. Thomson

[57] ABSTRACT

A flexible support bushing for use in fixing the position of an element such as a pipe or electrical cable in an aperture. A longitudinally extending flange can be clamped against the surface of the supported element by means of a hose clamp to secure the element against translational movement. A series of bushings all having the same outer diameter to fit in a standard size aperture and a variety of inner diameters to accomodate different size elements, is provided.

13 Claims, 1 Drawing Sheet

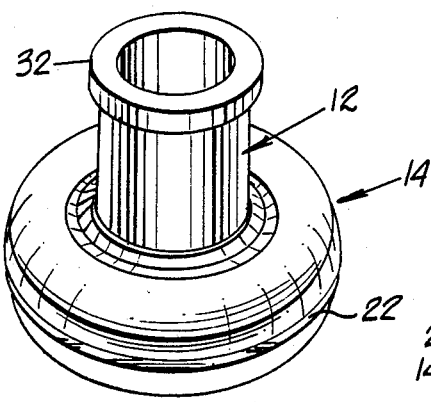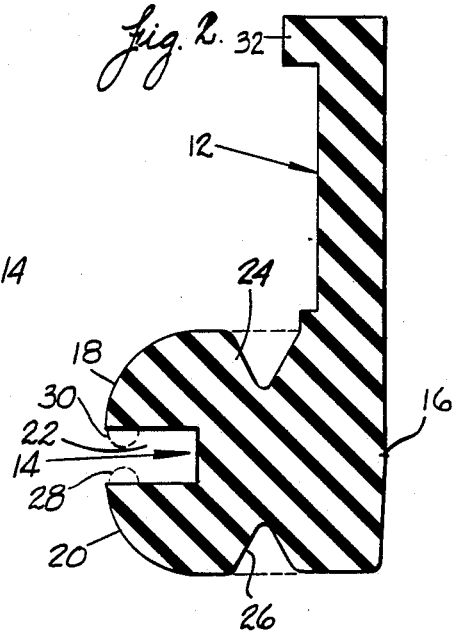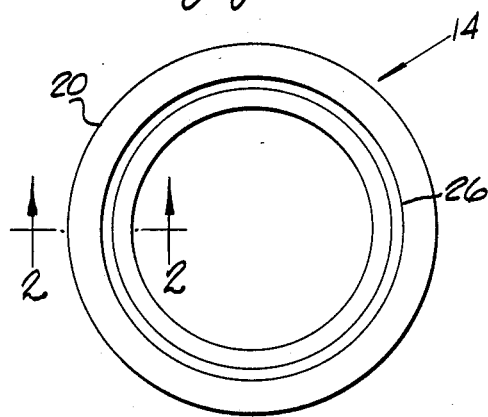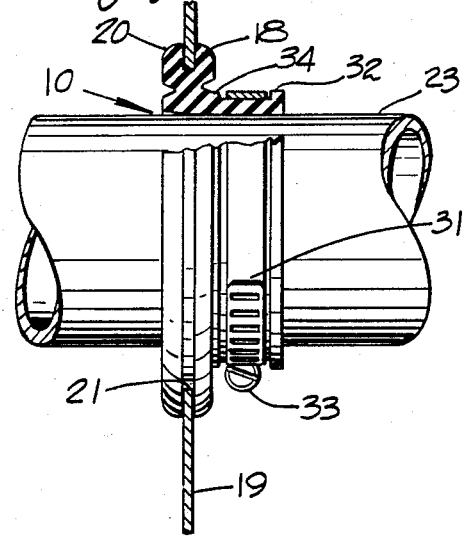

FLEXIBLE SUPPORT BUSHING

BACKGROUND AND SUMMARY OF THE INVENTION

The present invention is directed to solving problems in the construction industry. More particularly, the present invention is directed to a unitary flexible bushing for supporting elongated elements such as pipes, cables, conduits or the like, through structural members. These flexible bushings are especially useful in supporting and, if desired, clamping such elongated elements to sheet metal studs used in commercial construction.

In the construction of commercial buildings, the use of metal studs, most typically galvanized sheet steel, has become standard practice. To permit such elongated elements as water pipes, electrical cables and conduits to pass through the webs of the studs when these elements are installed in the wall or floor of the building, a tool is used to hand punch a series of one-size-fits-all holes, typically 1⅜", for all such elements. The resulting bare metallic edges of the holes in the stud walls can chew up the surfaces of the softer copper pipes and of electrical cables. Further, these generally oversized holes permit a great deal of translational as well as lateral movement. While a certain amount of such movement may be permissible in some instances, any movement will be undesirable in others. In addition, such openings readily permit the transmission of sound along the elongated elements and of air which can create room drafts and permit rapid propugation of flames in the event of a fire. Lastly, electrolytic degradation occurring between the two dissimilar metals results in corrosion damage to both the pipe and the metal stud.

Various attempts have previously been made to solve one or more of the abovestated problems. Typically, the prior art solutions involve specialized apparatus directed at specialized problems. Accordingly, these solutions are generally complicated and costly and have met with very little acceptance within the industry.

The flexible support bushing of the present invention is designed to solve the above identified problems. The bushing surrounds the elongated element and supports it in the center of the stud aperture out of contact with the sheet metal and prevents lateral movement. If desired, the support bushing can be clamped to the elongated element using a conventional hose clamp to prevent translational motion relative to the stud. The outer diameter of a portion of the flexible bushing is sized to fit within the standard 1⅜" aperture which is punched in the web of the stud. The design of this bushing permits installation in apertures which are accessible from only one side. A series of these bushings can accomodate a plurality of standard sizes of elongated elements; for example, ½", ¾" and 1" conventional copper pipe. In addition, the flexible bushing virtually closes off the unfilled portion of the opening against air flow and isolates the pipe against sound transmission. Lastly, simplicity of design enables the bushing of the present invention to be manufactured inexpensively. Various other features, advantages and characteristics of the present invention will become apparent from a reading of the following detailed description.

BRIEF DESCRIPTION OF THE DRAWING

FIG. 1 is a perspective view of a first embodiment of the flexible support bushing of the present invention;

FIG. 2 is an enlarged partial cross-sectional view of one embodiment of the flexible support bushing of the present invention as seen along line 2—2 of FIG. 3;

FIG. 3 is an end view of the flexible support bushing of the present invention;

FIG. 4 is an assembly drawing showing the interaction of the support bushing of the present invention with a through element such as a water pipe and the surrounding web of the stud.

DETAILED DESCRIPTION OF THE PREFERRED EMBODIMENTS

The flexible support bushing of the present invention is shown generally at 10. First annular portion 12 has a first outer diameter and a substantially uniform first inner diameter that conforms generally to the outer diameter of an element such as a pipe, cable, conduit or the like. First annular portion 12 is formed integrally with a second annular portion 14. Second annular portion 14 has a second outer diameter that is greater than the outer diameter of the first annular portion and an inner diameter that is coaxial with and generally equal to the inner diameter of said first annular portion. Support bushing 10 is designed to be used in construction employing sheet metal studs but can be used with electrical junction boxes or any thin metal plates. Indeed, the support bushing of the present invention could be used with wooden studs by modifying the design of the bushing or, more likely, drilling oversized holes in the stud and affixing a metal plate thereto.

Although the inner diameter of the second annular portion 12 is generally equal to that of the first, the two are not precisely equal. It is preferred that the inner diameter of the second portion have a double taper which tapers inwardly from each side of the second annular portion to define a ring 16 having the smallest inner diameter of the bushing. The diameter of ring 16 conforms to that of the outer diameter of the supported element. While the degree of taper can be any angle desired, an angle of one degree for each of the tapers has been found to be suitable. These tapers constitute relief angles reducing the surface contact between the bushing and the element permitting the pipe or cable to slide more easily through the support bushing. This relief can be particularly important when attempting to install an elongated pipe section through a series of bushing-clad apertures. Without such relief, frictional contact between the bushings and the pipe might cause the bushing to pop out of the wall aperture or might otherwise make installation difficult.

The second portion 14 has two radially extending flanges 18 and 20 which engage the material which surrounds the aperture 21 through which the element 23 passes (FIG. 4). Aperture 21 is preferably formed in a plate or web 19 of a sheet metal stud of the type used in commercial construction. The thickness of the sheet steel used in forming these studs can vary from 14 to 20 gauge. Preferably, the width of second annular portion between flanges 18 and 20 is sized to receive 14 gauge with the material of wall-engaging flanges 18 and 20 having sufficient flexibility to accomodate larger gauge material. A snug fit between the plate-engaging flanges and the sheet metal is important in limiting translational movement between the element and the wall of the stud as will become apparent hereafter.

It is preferred that the flexible support bushing of the present invention be made of a single material, for example, 50 durometer neoprene rubber. This bushing can be formed by conventional injection molding techniques in a two-piece, center post mold. While the bushing may be any length, an overall length of 1⅛" with a first portion length of about ⅜" has been found suitable. Each flexible bushing will have a second portion 14 with the same outer diameter as defined by the bottom of slot 22, such as 1⅜", for example. This is the hole size normally formed in the webs of the metal studs to permit installation of pipes, cables and the like. A series of bushings having a variety of inner diameters such as 0.625", 0.875" and 1.125" to accomodate standard ½", ¾" and 1" pipe, can be provided. While the distance plate-engaging flanges 18 and 20 extend outwardly from second portion 14 can be varied as necessary, a radial extent of 3/16" has proven satisfactory, making the maximum diameter of the bushing 1¾". The larger sized bushings can be formed as indicated in dotted lines in FIG. 2. However, the bushings with smaller inside diameters will be less flexible due to thicker walls in the second annular portion 14 and due to the smaller inner radius (i.e., less area into which the flange can collapse).

These smaller size bushings can be provided with annular grooves 24 and 26 to increase flexibility. This flexibility is particularly important with regard to installation procedures. Plate-engaging flange 20 must be able to collapse inwardly to permit the bushing to be installed in aperture 21 in the wall of metal stud 19. Because of the narrowness of slot 22, plate-engaging flanges 18 and 20 can tend to behave as a solid, inflexible flange. One means of increasing the flexibility of the bushing without adversely effecting performance is to widen slot 22 to between three and five times the width necessary to receive the web 19 of the sheet metal stud and provide a series of protrusions 28 and 30 as shown in dotted line in FIG. 2. These protrusions each about ⅛" to ¼" wide would be positioned equally about the inner peripheries of wall engaging flanges 18 and 20 in groups of 4 to 8. The two groups could be circumferentially offset if desired. The widening of slot 22 greatly increases flexibility while protrusions 28 and 30 snugly grasp the periphery of aperture 21 and prevent undesired translational movement.

While the primary function of bushing 10 is to support element 23 within aperture 21, it will sometimes be desirable to prevent longitudinal movement of the supported element. Such might be the case in closely toleranced plumbing fixtures or adjacent an electrical connection in the case of cables, such as at a junction box or the like. In such instances a conventional hose clamp 31 can be applied to the first annular portion before the insertion of element 23. A flange 32 extends laterally from the end of the first annular portion 12 opposite to the end connected to second portion 14. Flange 32 and shoulder 34 define an element clamping region of the bushing and confine the movement of the hose clamp. By tightening hose clamp 31 through adjustment screw 33, the element clamping region of first annular portion 12 is brought securely into engagement with the surface of element 23.

To install the support bushing of the present invention, the bushing with the proper inner diameter is selected, first annular portion 12 is gripped and wall-engaging flange 20 is pushed through aperture 21. If the clamping feature of the bushing is to be used, a hose clamp 31 is slipped passed flange 32 onto annular portion 12. Finally, the element (pipe, cable, conduit, or the like) is slipped through the bushing and clamped in place by turning screw 33. By using the flexible support bushing of the present invention, a variety of different sized elements can be supported in and protected against damage from the standard sized aperture that is punched in webs of sheet metal studs, electrical boxes or the like. Accordingly pipes can be protected from the corrosive effects of electrolytic degradation which occurs when two unlike metals come in contact. Further, the jagged metal edges will be kept from damaging the insulation on electrical cables and from potentially shorting out the electrical system.

Although, the support bushing of the present invention has been depicted as being used only with round elements, it will be understood that its flexibility enables this bushing to be used in securing oval or flat coaxial cables, or the like, as well. The support bushing fills the oversized aperture surrounding the supported element blocking off draft-inducing air flow and providing some sound and thermal insulation as well. Various changes, alternatives and modifications will become apparent following a reading of the foregoing specification. It is intended that all such changes, modifications, and alternatives as fall within the scope of the addended claims be considered part of the present invention.

I claim:

1. A flexible bushing adapted for engaging an element such as a cable, pipe, or the like, said element having an outer perimeter, said bushing adapted for attachment to, while supporting said element through a circular aperture in a plate, said aperture having a first inner circumference, said bushing comprising a unitary member having a first annular portion with a first outer diameter and a substantially uniform first inner diameter defining a second inner circumference which is generally equal to the outer perimeter of the element passing therethrough, a second annular portion integrally formed with said first annular portion and having a second outer diameter greater than said first outer diameter and defining a first outer circumference which is generally equal to said first inner circumference of said plate aperture, and having a second inner diameter generally equal to and coaxial with said first inner diameter, a first plate-engaging flange formed integrally with, and extending substantially radially from one side of said second annular portion a first distance, a second plate-engaging flange formed integrally with, and extending substantially radially from the other side of said second annular portion a second distance which is substantially equal to said first distance, each plate-engaging flange having a plate-engaging surface and a non-engaging surface and each said flange having sufficient flexibility to permit said flexible bushing to be installed from either side of said plate by pushing either flange through said aperture so that installation requires access to only one side of said plate.

2. The flexible bushing of claim 1 wherein each of said plate-engaging flanges has an annular groove in the non-engaging surface to increase flexibility.

3. A series of said flexible bushings of claim 1 wherein each of the bushings has substantially the same second outer diameter and a series of varying first inner diameters to accomodate elements of different diameters.

4. The flexible bushing of claim 1 wherein said two plate-engaging flanges are spaced apart by a distance substantially equal to the thickness of said plate.

5. The flexible bushing of claim 1 wherein said two plate-engaging flanges are spaced apart by a distance from three to five times the thickness of said plate and a series of protuberances on said plate-engaging faces narrow the effective distance between said flanges to a distance substantially equal to the thickness of said plate.

6. The flexible bushing of claim 1 wherein said second annular portion has a longitudinal center and said second inner diameter tapers inwardly from each side of the longitudinal center of said second annular portion.

7. The flexible bushing of claim 6 wherein the amount of said taper is about 1°.

8. The flexible bushing of claim 6 wherein the junction of said two tapers comprises a narrow annulus that defines the minimum inner diameter of said flexible bushing, said minimum inner diameter generally corresponding to said outer periphery of the element supported thereby.

9. The flexible bushing of claim 1 wherein the end of said first portion opposite said second portion has a laterally-extending flange protruding outwardly therefrom.

10. The flexible bushing of claim 9 wherein the region of said first annular portion between said laterally-extending flange and an opposing shoulder defines a pipe-gripping annulus of generally uniform thickness as defined by said first outer and said first inner diameters.

11. The flexible bushing of claim 10 further comprising an adjustable hose clamp encircling said pipe-gripping annulus to affix the position of said flexible bushing relative to said supported element.

12. A flexible support bushing adapted for encircling and clamping an element such as a pipe, cable or the like in position relative to a plate through which said element passes, said plate having a pre-determined thickness, said bushing comprising a unitary first member having a first annular portion with a first inner and a first outer diameter defining a pipe-gripping annnulus of substantially uniform thickness, said first annular portion being integrally formed with a second annular portion having a second inner diameter which is substantially equal to said first inner diameter and a second outer diameter larger than said first outer diameter, said second annular portion having two plate-engaging flanges which each extend radially outwardly an equal distance from said second annular portion and are spaced by a distance sufficient to accomodate said predetermined thickness of said plate, each said plate-engaging flange having a plate-engaging surface and a nonengaging surface, each said non-engaging surface having an annular groove formed therein to enhance flexibility, and a second member comprising an adjustable hose clamp encircling said pipe-gripping annulus and clamping said annulus snugly against the outer surface of said element with a uniform gripping force to prevent translational movement between said element and said plate.

13. A series of unitary, flexible support bushings each adapted for securing one of a variety of diameters of pipe, cable, or the like, in position relative to a plate having a standardized diameter aperture for receiving said bushings, said aperture having a predetermined periphery, each of said series of bushings comprising a first annular portion having a first inner and a first outer diameter, said first annular portion being integrally formed with a second annular portion having a second inner and a second outer diameter, each said first and second inner diameters being substantially equal to the outer diameter of the particular one of the variety of diameters of elements to be received therein, said second outer diameter of each bushing in said series being larger than its corresponding first outer diameter and substantially equal to said second outer diameter of each bushing in said series and, in turn, equal to the size of the standardized diameter aperture in said plate, each said second annular portion having two plate-engaging flanges of substantially equal diameter extending substantially radially therefrom and spaced by a distance which is at least equal to the thickness of the plate to engage said plate on each side thereof around the periphery of said standardized diameter aperture.

* * * * *